US010884256B2

(12) United States Patent
Niwa et al.

(10) Patent No.: US 10,884,256 B2
(45) Date of Patent: Jan. 5, 2021

(54) COLLIMATOR LENS AND LIGHT SOURCE DEVICE

(71) Applicant: CANON KABUSHIKI KAISHA, Tokyo (JP)

(72) Inventors: Kunihiro Niwa, Mishima (JP); Junya Azami, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 16/028,274

(22) Filed: Jul. 5, 2018

(65) Prior Publication Data

US 2019/0033611 A1    Jan. 31, 2019

(30) Foreign Application Priority Data

Jul. 28, 2017  (JP) ................. 2017-146060
Jun. 18, 2018  (JP) ................. 2018-115063

(51) Int. Cl.
   *G02B 27/30*   (2006.01)
   *G02B 7/02*    (2006.01)
   *G02B 27/09*   (2006.01)

(52) U.S. Cl.
   CPC ............ *G02B 27/30* (2013.01); *G02B 7/02* (2013.01); *G02B 27/09* (2013.01)

(58) Field of Classification Search
   CPC ..... G02B 27/30; G02B 7/022; G02B 27/0955; G02B 7/02; G02B 27/09
   USPC .......................................................... 359/641
   See application file for complete search history.

(56) References Cited

U.S. PATENT DOCUMENTS

2002/0075916 A1*  6/2002  Sato ................ G02B 7/025
                                              372/36

FOREIGN PATENT DOCUMENTS

JP   2004271906 A    9/2004
JP   2004-342714 A   12/2004

* cited by examiner

*Primary Examiner* — James R Greece
(74) *Attorney, Agent, or Firm* — Canon U.S.A., Inc. IP Division (57) ABSTRACT

A collimator lens to be held by a holder member, includes a lens portion including an area through which light passes, and a protruding portion protruding from the lens portion. The lens portion is formed on an outer peripheral surface of the collimator lens and includes a bonded portion to be bonded and fixed onto a bonding portion, which is formed on the holder member, through an adhesive. The protruding portion includes a plane formed on an outer peripheral surface of the protruding portion. The plane is formed at a position where a normal line to the plane intersects with the bonded portion.

16 Claims, 10 Drawing Sheets

COLLIMATOR LENS AND LIGHT SOURCE DEVICE

BACKGROUND OF THE INVENTION

Field of the Invention

The disclosure relates to a collimator lens and a light source device used for an optical scanning device that irradiates the surface of an image bearing member with a light beam according to image information.

Description of the Related Art

Image forming apparatuses, such as a laser beam printer and a digital copying machine, include a unit for modulating a semiconductor laser at high speed so as to form an image by irradiating the surface of a photosensitive drum with laser light that turns on and off according to image information.

Laser light output from the semiconductor laser is diffused light having a certain radiation angle. Accordingly, an image forming apparatus includes an optical scanning device in which an optical member, such as a lens, is disposed accurately so that an image is formed as a small spot on the surface of the photosensitive drum.

In particular, in a laser light source device provided in an optical scanning device including a semiconductor laser, a collimator lens for focusing laser light output from the semiconductor laser into desired parallel light or converged light is disposed. The collimator lens is most accurately aligned with respect to the semiconductor laser and is attached by known means such as an adhesive.

As a configuration of a light source device that includes a collimator lens and a light source using a semiconductor laser, a technique discussed in Japanese Patent Application Laid-Open No. 2004-342714 has heretofore been known. In this configuration, a holder member that holds the semiconductor laser includes a tubular portion for holding a lens, and the collimator lens is adjusted while being held by a tool and is fixed with an adhesive filled in a gap between the tubular portion and the collimator lens.

In the configuration discussed in Japanese Patent Application Laid-Open No. 2004-342714, three bonding portions for the collimator lens are formed on the holder member. In a case of curing a filled ultraviolet-curable adhesive, bonding and fixing are performed by irradiation of an ultraviolet (UV) light beam from a position (direction parallel to an XY plane) facing each bonding portion.

However, the recent trend of the miniaturization and color printing of apparatuses and an increase in the high-definition of images makes it difficult to maintain a space large enough to hold a collimator lens at three positions, and a laser light beam passage area in which a light beam is allowed to pass through the collimator lens has been increasing. This imposes a limitation on the number of bonding positions between the holder member and the collimator lens, and thus two or less bonding positions are set as discussed in Japanese Patent Application Laid-Open No. 2004-271906.

Figure 8:
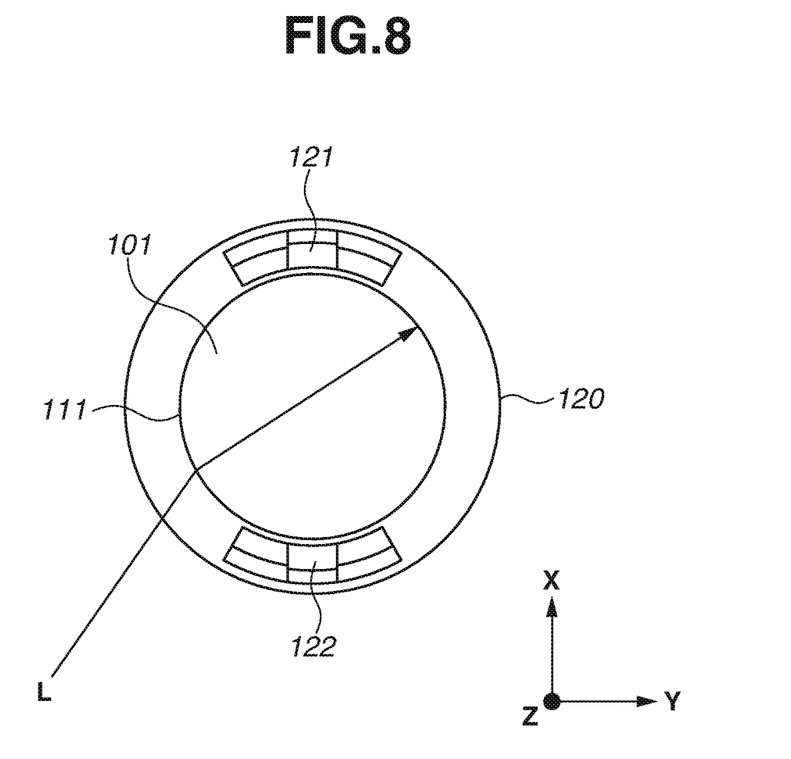
FIG. 8 is a diagram illustrating a state where a related art light source device radiates a UV light beam.

For example, as illustrated in FIG. 8, when two bonding positions for bonding a holder member 120 and a collimator lens 101 are set, bonding portions 121 and 122 are disposed at opposite positions in consideration of stabilizing the position of the collimator lens 101 after bonding. The arrangement of the bonding portions 121 and 122 in this manner makes it difficult to directly irradiate a UV light beam L from a position facing a bonding portion, unlike in the configuration in which three bonding portions are formed as discussed in Japanese Patent Application Laid-Open No. 2004-342714. More specifically, in the configuration illustrated in FIG. 8, the bonding portion 122 is disposed at the position facing the bonding portion 121, which makes it difficult to directly radiate the UV light beam L from the position (the bonding portion 122 in this example) facing the bonding portion 121.

Accordingly, in the configuration illustrated in FIG. 8, the UV light beam L is obliquely incident on each bonding portion on the XY plane. In this case, since the UV light beam L is obliquely incident, the UV light beam L is refracted by an outer peripheral surface 111 of the tubular collimator lens 101, which makes it difficult to allow the UV light beam L to fully reach the bonding portion 121 (122).

Thus, the quantity of the UV light beam that reaches each bonding portion is insufficient and a time required for fully curing the adhesive increases.

The strength of the UV light beam may be increased to reduce a time required for an assembly process. However, there is a possibility that the collimator lens may be thermally deformed due to the irradiation heat of the UV light beam and the position and shape of the collimator lens may be changed before and after the adjustment, which may cause change in optical characteristics.

There is another possibility that an adhesive uncured portion may be formed due to an occurrence of illuminance unevenness and the collimator lens whose position is adjusted by a tool may move due to an environmental change or a temporal change, which may lead to a deterioration in assembling accuracy.

In particular, in a color image forming apparatus that is configured using a plurality of combinations of semiconductor lasers and collimator lenses to form a plurality of scanning lines in an overlapping manner, fluctuating directions and fluctuation amounts of irradiation positions appear as a relative color shift, which may cause an adverse effect on images.

SUMMARY OF THE INVENTION

According to an aspect of the disclosure, a collimator lens to be held by a holder member, includes a lens portion including an area through which light passes, and a protruding portion protruding from the lens portion. The lens portion is formed on an outer peripheral surface of the collimator lens and includes a bonded portion to be bonded and fixed onto a bonding portion, which is formed on the holder member, through an adhesive. The protruding portion includes a plane formed on an outer peripheral surface of the protruding portion. The plane is formed at a position where a normal line to the plane intersects with the bonded portion.

Further features and aspects of the disclosure will become apparent from the following description of numerous example embodiments with reference to the attached drawings.

DESCRIPTION OF THE EMBODIMENTS

Numerous example embodiments, including various features and aspects thereof, of the disclosure will be described in detail below with reference to the drawings. However, the dimensions, materials, shapes of components, the relative arrangement thereof, and the like to be described in the following example embodiments are to be modified as necessary according to the configuration of an apparatus to which the disclosure is applied, and according to various conditions under which the apparatus is used. Therefore, the scope of the disclosure is not intended to be limited only to the following example embodiments of the disclosure, unless otherwise specified.

An optical scanning device including a light source device according to an example embodiment of the disclosure will be described with reference to FIGS. 1 to 7. First, the optical scanning device will be described. Next, the light source device will be described, and then the process of bonding and fixing a collimator lens onto a holder member in the light source device will be described.

<Example Optical Scanning Device>

Figure 1:
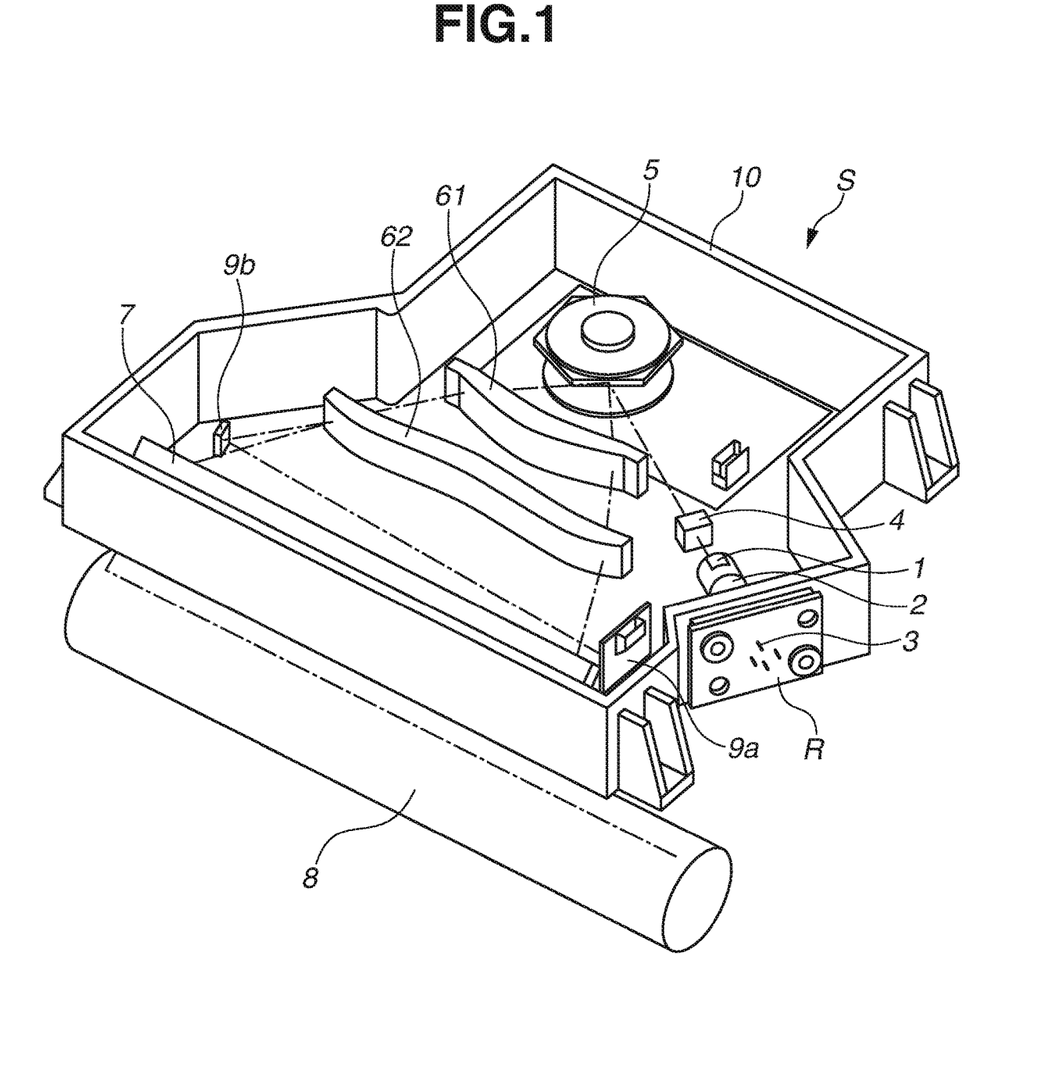
FIG. 1 is a perspective diagram illustrating a shape of a collimator lens according to an example embodiment of the disclosure.

Referring first to FIG. 1, an overall configuration of an optical scanning device S having a laser light source device R according to the present example embodiment mounted thereon will be described. FIG. 1 is a perspective view illustrating the overall configuration of the optical scanning device S according to the present example embodiment.

Referring to FIG. 1, laser light (light beam) output from the laser light source device R that outputs laser light that turns on and off according to image information is linearly focused on a reflecting surface of a rotating polygon mirror 5 by a cylindrical lens 4. The laser light that is linearly focused on the reflecting surface by the cylindrical lens 4 is linearly focused on the reflecting surface of the rotating polygon mirror 5 and is then deflected by a deflector including the rotating polygon mirror 5 that is rotated at high speed. The laser light deflected by the deflector including the rotating polygon mirror 5 is guided to a photosensitive drum 8 through imaging lens 61 and 62 each having fθ characteristics and through a folding mirror 7, so that an image is formed as a small spot on the photosensitive drum 8.

Referring to FIG. 1, a horizontal synchronous detection sensor 9a is configured to determine a starting position for writing an image, and a reflective mirror 9b is configured to guide laser light to the horizontal synchronous detection sensor 9a. An optical box 10 is covered with a lid member (not illustrated) to thereby form the optical scanning device S.

<Example Laser Light Source Device>

Figure 2:
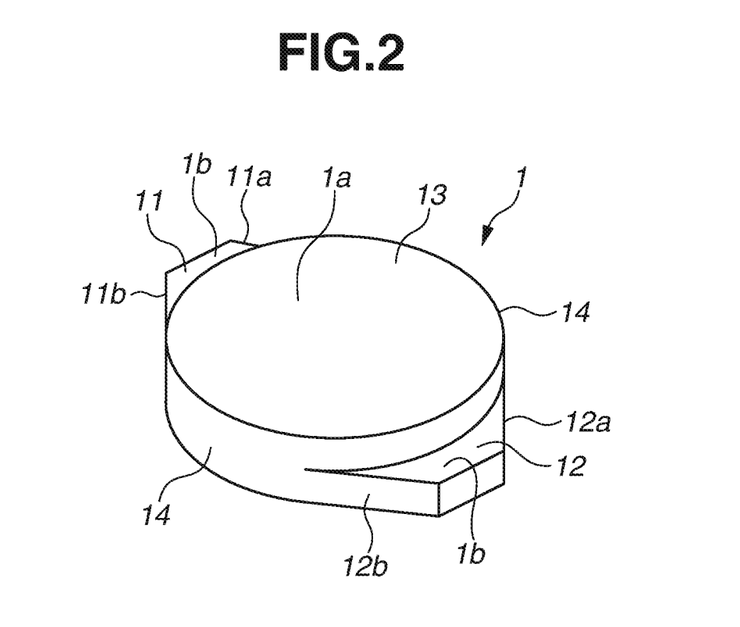
FIG. 2 is a diagram illustrating a configuration of a laser light source device according to the example embodiment.
Figure 3:
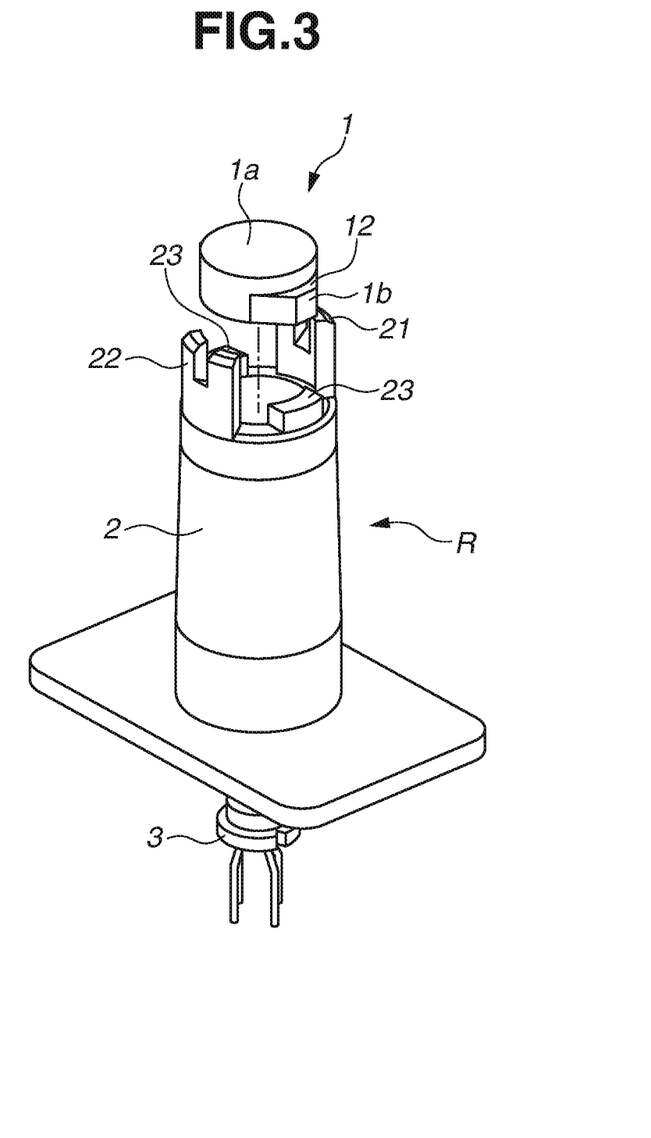
FIG. 3 is a diagram illustrating a positional relationship between the collimator lens and bonding portions according to the example embodiment.
Figure 4:
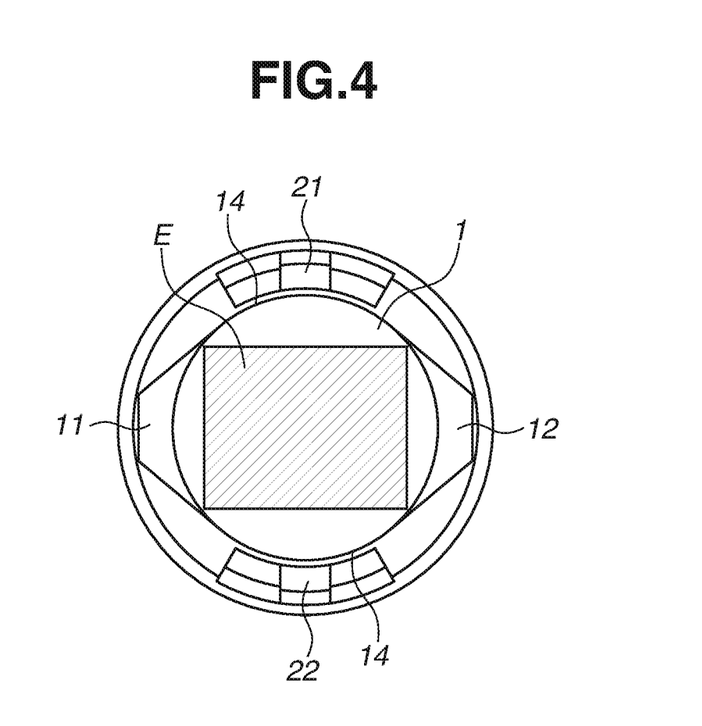
FIG. 4 is a diagram illustrating a configuration of an optical scanning device according to the example embodiment.

Next, the laser light source device R mounted on the optical scanning device S will be described with reference to FIGS. 2, 3, and 4. FIG. 2 is a shape diagram illustrating a shape of a collimator lens 1 according to the present example embodiment. FIG. 3 is a configuration diagram illustrating the laser light source device R. FIG. 4 illustrates a positional relationship of bonding portions of a holder member 2 with respect to a laser passage area of the collimator lens 1 when the laser light source device R is viewed from the collimator lens 1.

As illustrated in FIG. 3, the laser light source device R includes a semiconductor laser 3 as a light source, the collimator lens 1 that converts the laser light output from the semiconductor laser 3 into parallel light, and the holder member 2 for holding the semiconductor laser 3 and the collimator lens 1.

Figure 10:
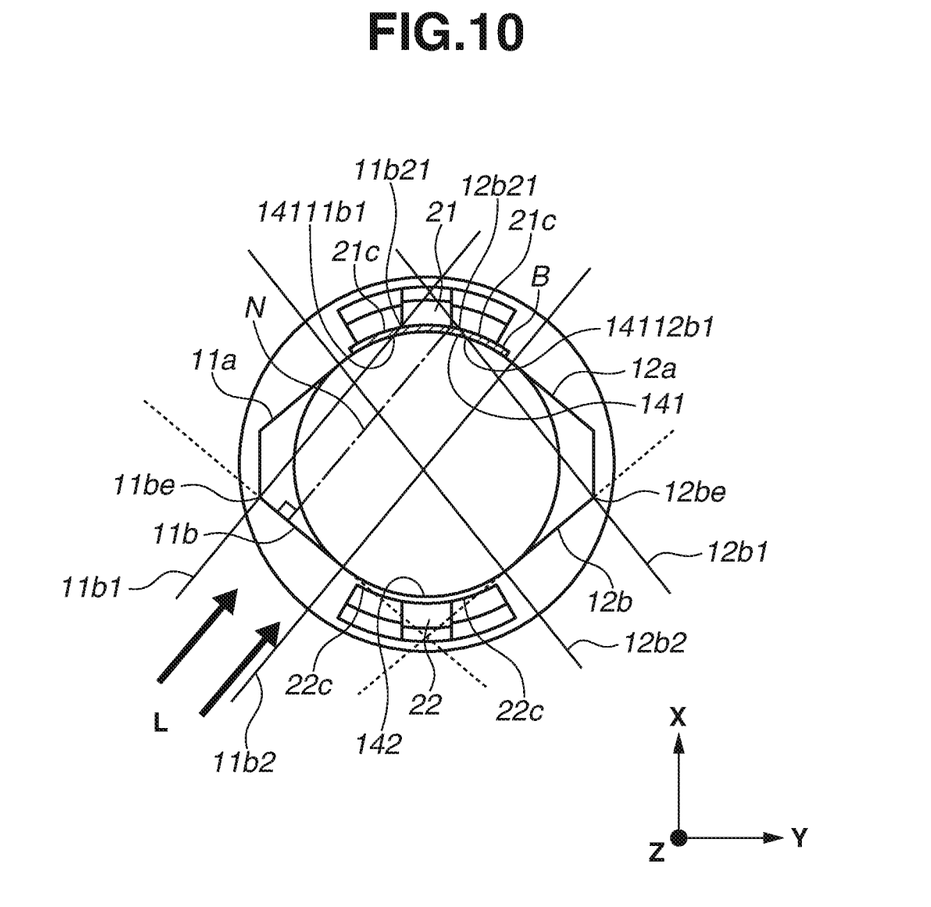
FIG. 10 is a diagram illustrating a positional relationship between the collimator lens and the bonding portions in detail.

Referring to FIG. 2, the collimator lens 1 converts the laser light output from the semiconductor laser 3 into parallel light. The collimator lens 1 is formed of a synthetic resin and includes a columnar lens portion 1a having a lens effective surface 13 having a convex surface for focusing the laser light output from the semiconductor laser 3. An outer peripheral surface of the lens portion 1a is provided with a bonded portion 14 to be bonded and fixed onto the holder member 2 through an adhesive. Protruding portions 11 and 12 that protrude outward from a side surface portion of the columnar shape are formed on the outside of the lens portion 1a. In the present example embodiment, the two protruding portions 11 and 12 (i.e., first protruding portion and second protruding portion) are formed. The protruding portions 11 and 12 are disposed to be point-symmetric to each other. The protruding portion 11 includes planes 11a and 11b, and the protruding portion 12 includes planes 12a and 12b. As illustrated in FIG. 10, the plane 11b of the protruding portion 11 is an area formed between a straight line 11b1 and a straight line 11b2. As illustrated in FIG. 10, the plane 12b is an area formed between a straight line 12b1 and a straight line 12b2. An area ranging from a point intersecting with the straight line 11b2 in a lower portion of the collimator lens 1 to a point intersecting with the straight line 12b2 as illustrated in FIG. 10 corresponds to a bonded portion of a lens portion 1a. A bonded portion 142 is a surface that is disposed so as to face a surface of a bonding portion 22 with a certain gap formed therebetween. An adhesive to be filled in the gap is cured to thereby bond and fix the bonding portion and the bonded portion. For convenience of the following explanation, the components are referred to as follows. The protruding portion 11 (i.e., first protruding portion) includes the eleventh plane 11a and the twelfth plane 11b as first planes. A normal line to the first plane is referred to as a first normal line, and the direction of the normal line is referred to as a first normal direction. The protruding portion 12 (second protruding portion) includes the twenty-first plane 12a and the twenty-second plane 12b as second planes. A normal line to the second plane is referred to as a second normal line, and the direction of the normal line is referred to as a second normal direction. The collimator lens 1 according to the present example embodiment includes at least the lens portion 1a and a protruding portion 1b.

As illustrated in FIGS. 3 and 4, the holder member 2 holds the semiconductor laser 3 at one end thereof and holds the collimator lens 1 at the other end thereof. The semiconductor laser 3 is fixed and held into a press-fit hole which is formed at one end of the holder member 2, by press-fitting.

The leading edge (the other end) of the holder member 2 is provided with bonding portions 21 and 22 for bonding and fixing the collimator lens 1 with an adhesive in such a manner that the bonding portions 21 and 22 face each other. The two bonding portions 21 and 22 are disposed in such a manner that a straight line connecting the bonding portions 21 and 22 passes through the center of the circular lens effective surface 13 of the collimator lens 1. At the other end of the holder member 2, lens seating surfaces 23 are respectively formed at two gaps between two bonding portions 21 and 22.

A light beam passage area E of the collimator lens 1 through which a light beam is allowed to pass by a rectangular aperture formed within the holder member 2 corresponds to a hatched area illustrated in FIG. 4. In the holder member 2, the two bonding portions 21 and 22 are disposed at the respective long sides of the rectangular aperture. Accordingly, a sufficient distance from the light beam passage area E is ensured in this configuration.

While the present example embodiment illustrates a configuration including a rectangular aperture, the shape of the aperture is not limited to this shape. The same advantageous effects as described above can be obtained by using, for example, a circular or elliptical aperture. The aperture need not necessarily be located within the holder member 2. The aperture may be formed in the optical box 10.

<Example Bonding Adjustment Process>

Figure 5:
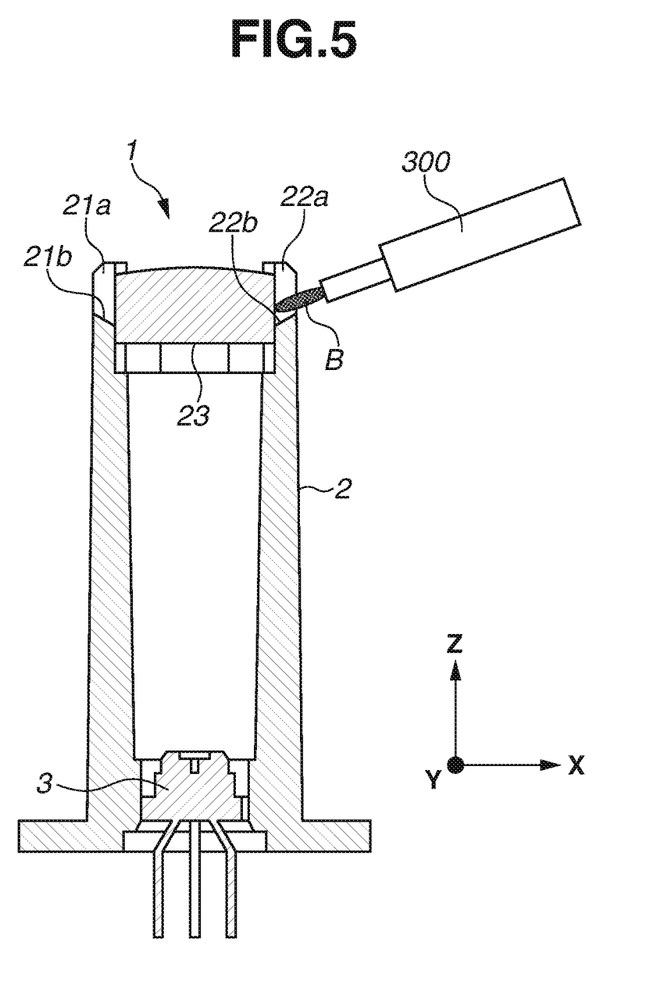
FIG. 5 is a diagram illustrating a state where an adhesive is applied onto the collimator lens.
Figure 6:
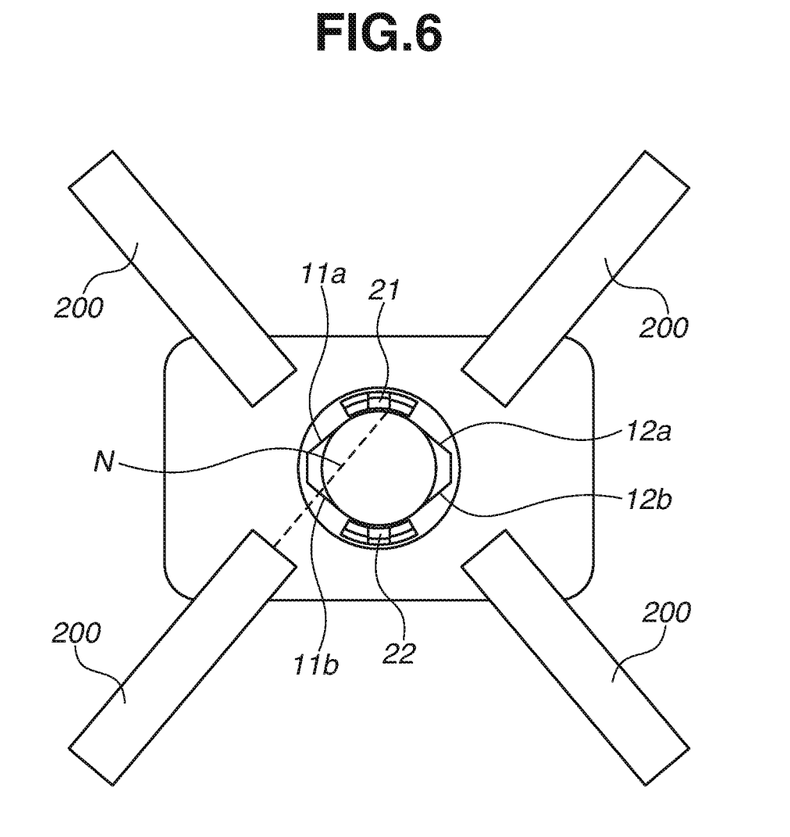
FIG. 6 is a diagram illustrating a state where a bonding portion is irradiated with an (ultraviolet) UV light beam.
Figure 7:
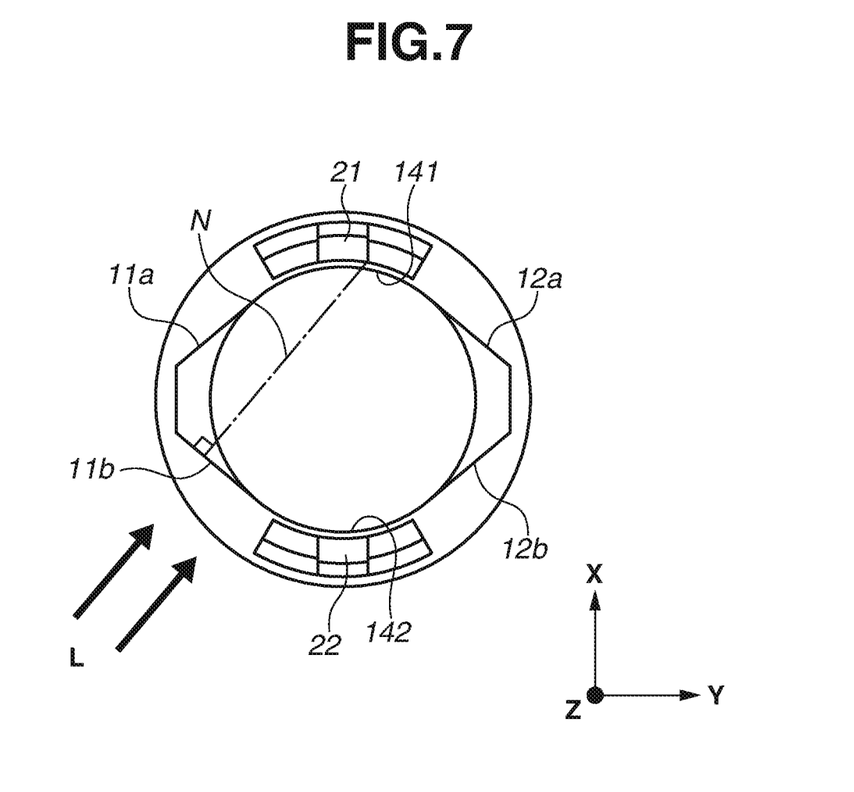
FIG. 7 is a diagram illustrating a positional relationship between the collimator lens and the bonding portions in detail.

Next, the process of bonding and fixing the collimator lens 1 onto the bonding portions 21 and 22 will be described with reference to FIGS. 5, 6, and 7. FIG. 5 is a sectional view illustrating a process of applying an adhesive B. FIG. 6 illustrates the process of UV irradiation when the laser light source device R is viewed from the collimator lens 1 side. FIG. 7 is a detailed diagram illustrating a positional relationship between the planes 11a and 11b and planes 12a and 12b of the collimator lens 1 and the bonding portions 21 and 22. FIG. 10 is also a detailed diagram illustrating a positional relationship between the collimator lens 1 and the bonding portions 21 and 22.

The collimator lens 1 is temporarily placed on the lens seating surfaces 23 of the holder member 2. The collimator lens 1 includes the lens portion 1a and the protruding portion 1b that protrudes from the lens portion 1a toward the outside of the lens portion 1a, and the protruding portion 1b is temporarily placed on the lens seating surfaces 23. In this state, the adhesive B of an ultraviolet-curable type is filled in adhesive reservoirs 21a and 22a, which are formed in the respective bonding portions 21 and 22 by using an adhesive application tool 300. The adhesive reservoirs 21a and 22a are provided with inclined portions 21b and 22b, respectively. The inclined portions 21b and 22b are each inclined downward in a direction from the outside of the holder member 2 toward the inside (side where the lens is held) of the holder member 2. The adhesive B that is filled along the inclined portions 21b and 22b flows into a gap between the bonding portions 21 and 22 and the bonded portion (adhesive surface) 14 of the collimator lens 1 (see FIG. 10).

Next, the outer peripheral surface of the collimator lens 1 is clamped at three positions by a tool (not illustrated), and the position of the collimator lens 1 is adjusted in X (main scanning), Y (sub-scanning), and Z (focus) directions illustrated in FIG. 5.

In the processes of applying the adhesive B and adjusting the position of the collimator lens 1, the position of the collimator lens 1 is adjusted by lifting the collimator lens 1 from the seating surfaces 23 on which the collimator lens 1 is temporarily placed. Accordingly, there is a possibility that the adhesive B may run on the lens effective surface 13 of the collimator lens 1 and block the light beam, which may lead to a reduction in light quantity and deterioration in spot diameter.

However, in the present example embodiment, the light beam passage area required for the collimator lens 1 is configured as the light beam passage area E illustrated in FIG. 4 and the bonding portions 21 and 22 are formed on a narrower side of the light beam passage area of the collimator lens 1 through which the light beam is allowed to pass. Accordingly, even if the adhesive B runs on the lens effective surface 13, the adhesive B can be located sufficiently far from the laser beam. This prevents a reduction in light quantity and a deterioration in spot diameter.

Next, the process of curing the adhesive B by the UV light beam L to bond and fix the collimator lens 1 onto the holder member 2 will be described with reference to FIGS. 6, 7, and 10.

The positional relationship between the components when the UV light beam L is incident on each component in the process of bonding and fixing will now be described in detail.

The plurality of first planes 11a and 11b, each of which is formed on the first protruding portion 11 of the collimator lens 1, and the plurality of second planes 12a and 12b, each of which is formed on the second protruding portion 12 of the collimator lens 1, are each formed at a position where a normal line N passing through the corresponding one of the planes 11a and 11b and 12a and 12b intersects with the bonding portion 21 and the bonding portion 22 which face each other. The first planes 11a and 11b and the second planes 12a and 12b are disposed in such a manner that the first planes 11a and 11b and the second planes 12a and 12b overlap at least a part of the bonding portion 21 and a part of the bonding portion 22, respectively, as viewed along the normal direction.

While the relationship between the planes and the bonding portions of the holder member 2 has been described above, the positional relationship between the planes and the bonded portion of the collimator lens 1 will be described below (see FIG. 10). The plurality of first planes 11a and 11b, each of which is formed on the first protruding portion 11 of the collimator lens 1, and the plurality of second planes 12a and 12b, each of which is formed on the second protruding portion 12 of the collimator lens 1, are each formed at a position where the normal line N passing through the corresponding one of the first planes 11a and 11b and second planes 12a and 12b intersects with the bonded portions 141 and 142 which face each other. The first planes 11a and 11b and the second planes 12a and 12b are disposed in such a manner that the first planes 11a and 11b and the second planes 12a and 12b overlap at least a part of the bonded portion 141 and a part of the bonded portion 142, respectively, as viewed along the normal direction. Assuming that the entire surface of each bonding portion as viewed along the normal direction of the corresponding plane is 100%, the plane is preferably formed so as to overlap the bonding portion within a range from 50% to 100%. Similarly, assuming that the entire surface of the bonded portion as viewed along the normal direction of the corresponding plane is 100%, the plane is preferably formed so as to overlap the bonding portion within a range from 50% to 100%.

The bonded portion 141 of the lens portion 1a of the collimator lens 1 is formed on the straight line 11b1 which passes through an end 11be of the first plane that is parallel to the normal line to the first plane and is farthest from the lens portion 1a. The bonding portion 21 is also formed on the straight line 11*b*1. In the present example embodiment, the bonded portion 141 is formed on the straight line 12*b*1 which passes through an end 12*be* of the second plane that is parallel to the normal line to the second plane and farthest from the lens portion 1*a*. The bonding portion 21 is also formed on the straight line 12*b*1. Adhesive reservoirs each retaining an adhesive located in the corresponding bonding portion are formed on the straight line 11*b*1 and the straight line 12*b*1, respectively.

The normal line to the first plane is preferably located between the straight line 11*b*1 and the straight line 11*b*2 and the bonding portion and the bonded portion are preferably formed within an area between the two straight lines 11*b*1 and 11*b*2. Similarly, the normal line to the second plane is preferably located between the straight line 12*b*1 and the straight line 12*b*2 and the bonding portion and the bonded portion are preferably formed within an area between the straight lines 12*b*1 and 12*b*2.

The bonded portion 141 of the lens portion 1*a* according to the present example embodiment is an area formed between a point 14111*b*1 intersecting with the straight line 11*b*1 and a point 14112*b*1 intersecting with the straight line 12*b*1, and the bonded portion 141 can receive two UV light beams L, thereby enabling more effective curing of the adhesive. The bonding portion 21 of the holder member 2 according to the present example embodiment is an area formed between a point 11*b*21 intersecting with the straight line 11*b*1 and a point 12*b*21 intersecting with the straight line 12*b*1, and the bonding portion 21 can receive two UV light beams L, thereby enabling more effective curing of the adhesive.

The bonding portion 21 is irradiated with UV light beams from the planes 11*b* and 12*b* side. The range between the normal lines to the respective plane 11*b* and the plane 12*b* is sufficiently large. Accordingly, the normal line N intersects with the bonding portion even after the position of the collimator lens 1 is adjusted. The same holds true for the planes 11*a* and 12*a* with respect to the bonding portion 22.

UV irradiators 200 are disposed at positions respectively facing the planes 11*a* and 11*b* and planes 12*a* and 12*b* of the collimator lens 1. The UV irradiators 200 are each disposed so that the UV light beam L radiated from each UV irradiator 200 is radiated in the normal direction of the corresponding one of the planes 11*a* and 11*b* and planes 12*a* and 12*b*.

As described above, the bonding portions are each formed in the normal direction of the corresponding one of the planes 11*a* and 11*b* and planes 12*a* and 12*b* which are formed on the protruding portions 11 and 12, respectively, of the collimator lens 1, and the UV light beam L is radiated along the normal line. Consequently, the UV light beam L is vertically incident on each of the planes 11*a* and 11*b* and the planes 12*a* and 12*b* of the collimator lens 1. Accordingly, it is possible to effectively guide the UV light beam L to the bonding portions filled with the adhesive B, without causing refraction of the UV light beam L by the collimator lens 1.

Effectively irradiating the bonding portions with the UV light beam L enables a reduction in the time required for curing the adhesive B, which leads to an improvement in productivity. In addition, since it is possible to prevent leaving an adhesive uncured portion, the position of the collimator lens 1 after bonding becomes more stable, so that an environmental change or a temporal change thereof is less likely to occur.

Further, since an occurrence of illuminance unevenness of the UV light beam in the Z direction can be prevented, a time difference in curing the adhesive B can be eliminated, and thus change in the position of the collimator lens 1 in the Z (focus) direction due to cure shrinkage of the adhesive B can be reduced.

Furthermore, irradiation heat due to undesired UV irradiation can be reduced, thereby suppressing thermal deformation of the collimator lens 1 and the holder member 2 and preventing a deterioration in optical characteristics.

The collimator lens 1, the holder member 2, and the semiconductor laser 3 are integrated into the laser light source device R through the processes described above.

In the present example embodiment, the two bonding portions 21 and 22 of the holder member 2, the two protruding portions 11 and 12 of the collimator lens 1, the two planes 11*a* and 11*b*, and the two planes 12*a* and 12*b* are formed. However, the number of bonding portions, the number of protruding portions, and the number of planes are not particularly limited, as long as the bonding portions, the protruding portions, and the planes are disposed substantially equally in the circumferential direction of the holder member 2 to which the collimator lens 1 is bonded.

As described above, the collimator lens 1 is provided with the protruding portion 11 and the protruding portion 12 on which the planes 11*a* and 11*b* and the planes 12*a* and 12*b* are respectively formed. This configuration prevents refraction of the UV light beam L incident on the collimator lens 1, enables the UV light beam L to be effectively guided to the bonding portions 21 and 22, and also enables the adhesive B to be sufficiently cured. Accordingly, it is possible to reduce the time required for curing, to suppress change in the position of the collimator lens 1 in the process of bonding and fixing, and to achieve the assembly process with high reliability and productivity.

The collimator lens 1 described in the present example embodiment is not limited to a collimator lens made of a resin, and instead a collimator lens made of glass, or a composite collimator lens made of glass and resin may be used.

The present example embodiment is described using, as a component of the light source device, a configuration in which the semiconductor laser and the collimator lens are held by the holder member by using the holder member provided separately from the optical box. However, the disclosure is not limited to this configuration. The same advantageous effects as described above can be obtained by, for example, directly press-fitting the semiconductor laser into the optical box (holder member) constituting the optical scanning device to form a bonding portion on the optical box and then adjusting and bonding the collimator lens.

The scope of the disclosure is not limited to the dimensions, materials, shapes, optical arrangements, and the like of the components, unless otherwise specified.

While an ultraviolet-curable adhesive is used as the adhesive in the example embodiment described above, other photo-curable adhesives can also be used.

While the present example embodiment is described using, as an example, the optical scanning device that irradiates a single photosensitive drum with laser light, the disclosure is not limited to this. The same advantageous effects as described above can be obtained by applying the present example embodiment to a light source device in an optical scanning device that irradiates each of a plurality of photosensitive members with laser light.

While the present example embodiment is described using, as an example, the configuration of the optical scanning device (see FIG. 1) that exposes the surface of the photosensitive drum (image bearing member) to light from the upper side of the photosensitive drum, the disclosure is not limited to this. The same advantageous effects as described above can be obtained by applying the present example embodiment to a light source device in an optical scanning device that exposes the surface of a photosensitive drum to light from a side or a lower side of the photosensitive drum.

<Example Image Forming Apparatus>

An overall configuration of an image forming apparatus including an optical scanning device using a light source device including a collimator lens and an image forming operation of the image forming apparatus will be described below with reference to the drawings. In the present example embodiment, a light operating device that exposes the surface of a photosensitive drum to light from a side of the photosensitive drum is used.

Figure 9:
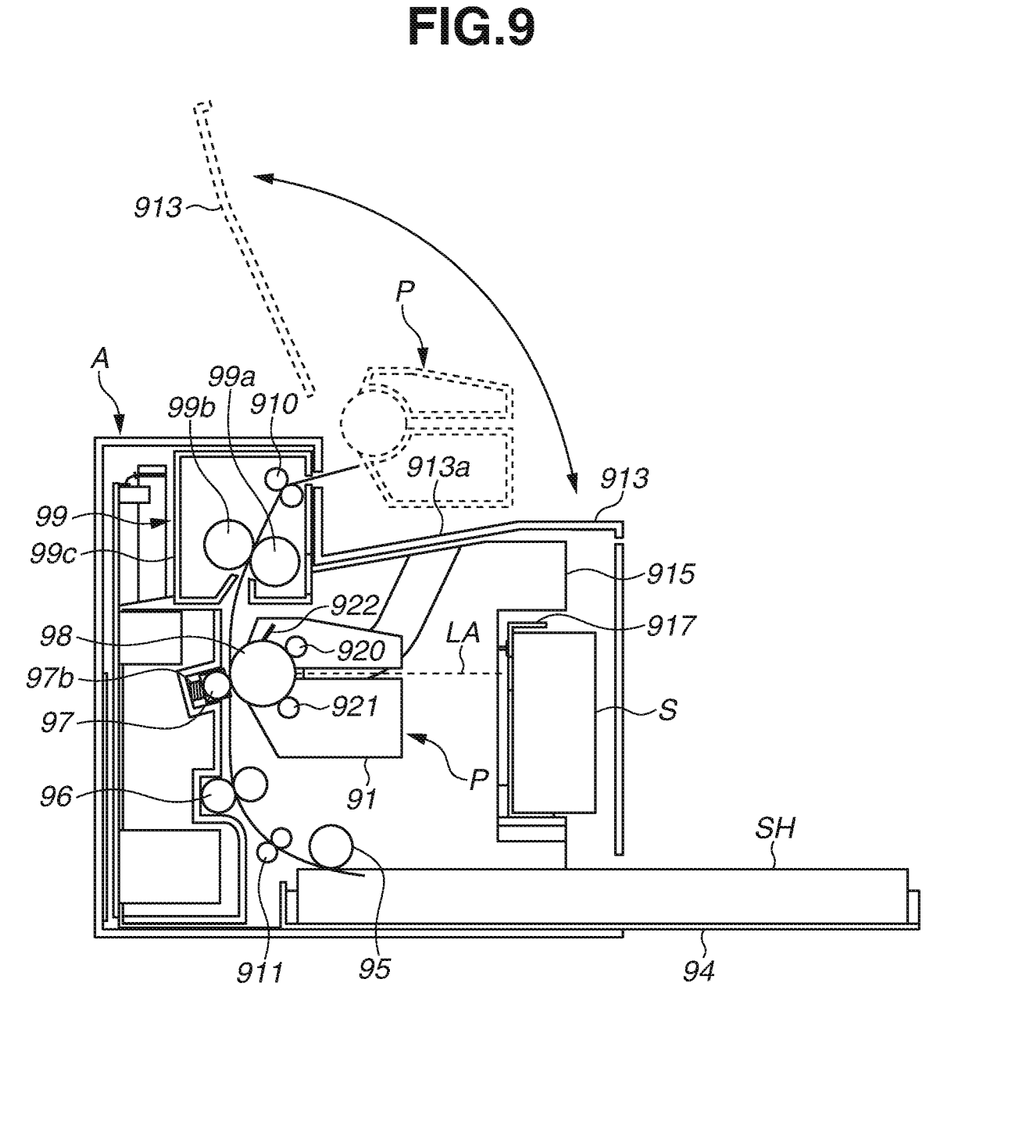
FIG. 9 is a sectional diagram schematically illustrating an image forming apparatus.

As illustrated in FIG. 9, an image forming apparatus A includes an image forming unit that transfers a toner image onto a sheet, a sheet feeding unit that supplies a sheet toward the image forming unit, and a fixing unit that fixes the toner image onto the sheet.

The image forming unit includes a process cartridge P that is attachable to and detachable from a main body of the image forming apparatus A, the optical scanning device S, and a transfer roller 97. The process cartridge P includes a photosensitive drum 98 as a rotatable photosensitive member, a charging roller 920, a developing device 91, and a cleaning blade 922. An optical base 917 formed of a plate is provided at a portion facing the process cartridge P, and the optical scanning device S (optical scanning unit) is mounted on the optical base 917.

Both ends of the transfer roller 97 are rotatably supported by bearing members. The transfer roller 97 is formed so as to apply a predetermined contact pressure to the surface of the photosensitive drum 98 by a pressing spring 97b attached to the bearing member.

A fixing device 99, which is a fixing unit, includes a pressure roller 99b and a heat roller 99a, which are rotatably supported with respect to a frame 99c. The pressure roller 99b and the heat roller 99a form a fixing nip portion. The frame 99c of the fixing device 99 is fixed to an upper surface portion of a side plate 915 of the main body of the image forming apparatus A with screws.

At an upper portion of the image forming apparatus A, an opening/closing door 913 that is openable and closable by pivotal movement is mounted on the main body of the image forming apparatus A. A user opens the opening/closing door 913, so that the process cartridge P can be attached to or detached from the main body of the image forming apparatus A.

Next, the image forming operation will be described. In the image forming operation, first, when a control unit receives an image forming job signal, sheets SH, which are stacked and stored in a sheet stacking portion 94, are fed out by a feed roller 95 and conveyance rollers 911 one by one to a registration roller 96 which is in a stopped state. Next, the sheet SH is caused to abut against a nip portion of the registration roller 96, and a skew is corrected due to stiffness of the sheet SH. After that, the registration roller 96 is rotated at a predetermined timing, so that the sheet SH is conveyed to a transfer nip portion formed of the photosensitive drum 98 and the transfer roller 97.

On the other hand, in the image forming unit, a bias is applied to the charging roller 920, thereby electrically charging the surface of the photosensitive drum 98 (photosensitive member) that is in contact with the charging roller 920. After that, the optical scanning device S, which is an optical scanning unit, outputs laser light LA from a light source, and irradiates the surface of the photosensitive drum 98 with the laser light LA according to image information. Thus, the potential of the photosensitive drum 98, which is a photosensitive member, is partially lowered, so that an electrostatic latent image corresponding to the image information is formed on the surface of the photosensitive drum 98.

After that, a bias is applied to a developing sleeve 921 included in the developing device 91 (developing unit), thereby causing toner to adhere to the electrostatic latent image formed on the surface of the photosensitive drum 98 (photosensitive member) from the developing sleeve 921, to thereby form a toner image.

Next, the toner image formed on the surface of the photosensitive drum 98 is fed into the transfer nip portion that is formed of the photosensitive drum 98 and the transfer roller 97. When the toner image reaches the transfer nip portion, a bias having a polarity opposite to the charging polarity of the toner is applied to the transfer roller 97, thereby transferring the toner image onto the sheet SH. Residual toner remaining on the surface of the photosensitive drum 98 after the transfer of the toner image is scraped off and removed by the cleaning blade 922.

After that, the sheet SH having the toner image transferred thereto is delivered to the fixing device 99 and is then heated and pressurized in the process of passing through the fixing nip portion of the fixing device 99, so that the toner image is thermally fused and then thermally fixed onto the sheet SH. After that, the sheet SH is discharged to a discharge portion 913a by a discharge roller 910.

While the disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Applications No. 2017-146060, filed Jul. 28, 2017, and No. 2018-115063, filed Jun. 18, 2018, which are hereby incorporated by reference herein in their entirety.

What is claimed is:

1. A collimator lens to be held by a holder member, the collimator lens comprising:
   a lens portion including an area through which light passes;
   a bonded portion to be bonded and fixed onto a bonding portion of the holder member through an adhesive, the bonded portion being formed on an outer peripheral surface of the lens, which is different from a light incident surface and a light emitting surface of the lens portion; and
   a protruding portion protruding from the outer peripheral surface of the lens of the lens portion in a direction perpendicular to an optical axis direction of the lens portion,
   wherein, as seen in the optical axis direction, the protruding portion includes a plane formed on an outer peripheral surface of the protruding portion,
   wherein as seen in the optical axis direction, at least a part of the bonded portion is located in an area between a first straight line and a second straight line, and
   wherein as seen in the optical axis direction, the first straight line passes through a first end portion of the plane and the second straight line passes through a second end portion of the plane on the opposite side of the first end portion of the plane.

2. The collimator lens according to claim 1,
wherein the collimator lens includes two protruding portions, and
wherein the two protruding portions are disposed to be point-symmetric to each other.

3. The collimator lens according to claim 1, wherein the bonded portion is formed on the straight line.

4. The collimator lens according to claim 1, wherein, assuming that the protruding portion is a first protruding portion, the plane is a first plane, the collimator lens includes a second protruding portion having a second plane, and
wherein as seen in the optical axis direction, at least a part of the bonded portion is located in an area between a third straight line and a fourth straight line,
wherein as seen in the optical axis direction, the third straight line and the fourth straight line are straight lines perpendicular to the second plane, and
wherein as seen in the optical axis direction, the third straight line passes through a first end portion of the second plane and the fourth straight line passes through a second end portion of the second plane on the opposite side of the first end portion of the second plane.

5. The collimator lens according to claim 4, wherein, assuming that the protruding portion is a first protruding portion, the plane is a first plane, the collimator lens includes a second protruding portion having a second plane, and the second plane is formed so that the second plane overlaps at least a part of the bonded portion as viewed along the third straight line.

6. The collimator lens according to claim 5, wherein a part of the bonded portion overlapping the first plane as viewed along the first straight line is a portion identical with a part of the bonded portion overlapping the second plane as viewed along the third straight line.

7. The collimator lens according to claim 5, wherein, assuming that an entire surface of the bonding portion as viewed along the first straight line is 100%, the first plane is formed so that the first plane overlaps the bonding portion within a range from 50% to 100%.

8. A light source device, comprising:
a light source;
the collimator lens according to claim 1; and
a holder member configured to hold the light source and the collimator lens, the holder member includes a bonding portion for bonding and fixing the collimator lens by an adhesive.

9. The light source device according to claim 8,
wherein the holder member includes a plurality of bonding portions for bonding and fixing the collimator lens, and
wherein the plurality of bonding portions is equally disposed in a circumferential direction of the collimator lens.

10. The light source device according to claim 8,
wherein the holder member includes two bonding portions, and
wherein the two bonding portions are formed at opposite positions so that a straight line connecting the two bonding portions passes through a center of the collimator lens.

11. The light source device according to claim 8, wherein the bonding portion is disposed at a long side of a light beam passage area of the collimator lens through which a light beam is allowed to pass by a rectangular aperture formed within the holder member.

12. The light source device according to claim 8, wherein the bonding portion included in the holder member includes an adhesive reservoir for filling an adhesive in a gap between a bonded portion of the collimator lens and the bonding portion of the holder member.

13. The light source device according to claim 12, wherein the adhesive reservoir includes an inclined portion inclined downward in a direction from an outside of the holder member to an inside of the holder member.

14. An optical scanning device comprising:
a light source device according to claim 8; and
a deflector including a rotating polygon mirror configured to deflect laser light output from the light source device.

15. An image forming apparatus comprising:
an optical scanning device according to claim 14; and
an image bearing member configured to form a latent image on a surface of the image bearing member by being irradiated with deflected laser light,
wherein the latent image is developed to form a developer image and the developer image is transferred onto a recording material to form an image on the recording material.

16. The collimator lens according to claim 1, wherein, assuming that an entire surface of the bonded portion as viewed along the first straight line is 100%, the first plane is formed so that the first plane overlaps the surface of the bonded portion within a range from 50% to 100%.

* * * * *